UNITED STATES PATENT OFFICE.

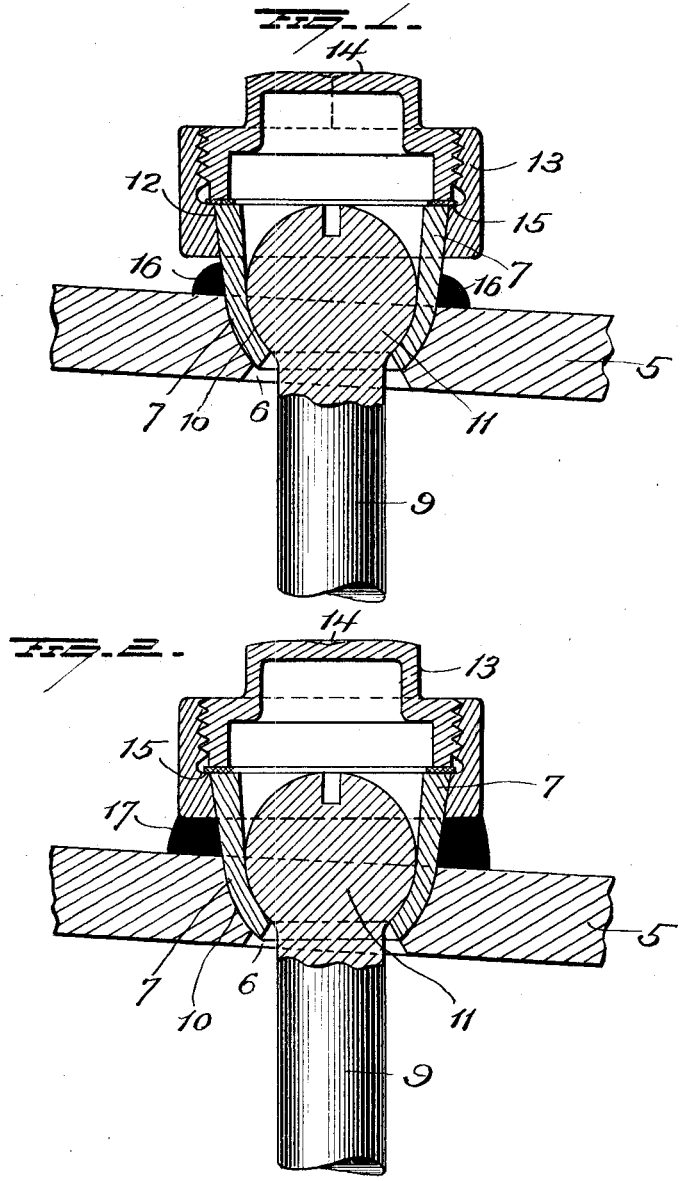

JOHN ROGERS FLANNERY, OF PITTSBURGH, PENNSYLVANIA, AND ETHAN I. DODDS, OF CENTRAL VALLEY, NEW YORK, ASSIGNORS TO FLANNERY BOLT COMPANY, OF PITTSBURGH, PENNSYLVANIA.

STAYBOLT STRUCTURE.

1,401,683.  Specification of Letters Patent.  Patented Dec. 27, 1921.

Application filed January 27, 1921. Serial No. 440,422.

*To all whom it may concern:*

Be it known that we, JOHN ROGERS FLANNERY and ETHAN I. DODDS, citizens of the United States, and residents of Pittsburgh and Central Valley, in the counties of Allegheny and Orange and States of Pennsylvania and New York, respectively, have invented certain new and useful Improvements in Staybolt Structures; and we do hereby declare the following to be a full, clear, and exact description of the invention, such as will enable others skilled in the art to which it appertains to make and use the same.

Our invention relates to an improvement in staybolt structures.

In the staybolts having universally adjustable cup shaped bolt bearing members or sleeves as now manufactured, the bearing members or sleeves are necessarily of considerable depth in order to house the bolt head and provide for the attachment of the cap thus making them difficult and expensive to manufacture.

The object of the invention is to simplify the manufacture and cheapen the cost of construction and it consists in making the bearing member of two parts one of which is ring shaped and having a tapering lower end adapted to telescope with a short cup shaped member and be held thereon and form a tight joint by friction. It further consists in the details of construction as will be more fully explained and pointed out in the claims.

In the accompanying drawings Figure 1 is a view in longitudinal section through a stay bolt structure embodying our invention and Fig. 2 is a similar view of a modification.

5 represents the outer shell of the boiler having a bolt opening 6 therein the outer part of the wall of said opening being curved to form a seat for the convex end of the bolt bearing member 7. The curvature of the wall of the opening and the inner end of the member 7 are in the arcs of a circle to permit the bearing member to be universally adjustable so that its long axis may be parallel with the long axis of the bolt 9.

The bolt bearing member 7 is open at its inner end for the passage of the bolt 9, and is provided interiorly with a curved seat 10 for the head 11 of the bolt 9 so that the bolt head has a free and universal movement on its seat. The outer surface of the member 7 is made conical with its widest diameter at the top to form a bearing 12 for the ring 13 the inner face of the inner end of which is beveled to conform to the tapered seat 12 of the bearing member 7. The ring is of greater diameter than the portion of the bearing member at the rear of or below the conical seat 12 and is placed in position over the smaller end of the bearing member 7 before the latter is mounted in its seat in the boiler sheet 5.

The ring 13 is threaded internally at its outer end to engage the external threads on flange of cap 14, the lower end of which flange is adapted to bear against a gasket 15 seated on the outer end of bearing member 7.

From the foregoing it will be seen that when the ring 13 is applied to the bearing member 7, it can be moved outwardly thereon until the inclined face of the ring contacts with the inclined surface 12 of the bearing member and then by screwing the cap 14 to the ring the inner edge of the flange of the cap contacting with the gasket 15 on the bearing member 7, pulls the ring 13 outwardly thus clamping the ring to the bearing member and forming a steam tight joint not only between the cap and bearing member, but between the ring and the bearing member.

In assembling the parts the ring is first passed over the smaller end of the bearing member and pulled outwardly until its inclined face engages the inclined face of the bearing member where it will be held by frictional contact. The bearing member may be then passed onto the bolt and the latter secured in the usual and well known manner to the inner sheet of the boiler. As the contacting face of the bearing member and outer sheet are curved, it follows that the former can be adjusted so that its long axis will be parallel with the bolt. After the bearing member has been properly located, which of course may be before the stay bolt 9 has been finally secured to the inner shell, it is permanently secured to the outer sheet by welding it as at 16, the weld preferably being continuous around the bearing member to prevent the possibility of leakage of steam around the latter. If desired the weld may be continued up as at 17 shown in Fig. 2, so as to permanently unite the sleeve to the bearing member.

With this construction comparatively shallow bearing members may be used, the ring forming a continuation or extension of the latter for the attachment of the cap 14, which being removable permits of the ready inspection of the bolt at any time.

It is evident that many slight changes might be resorted to in the relative arrangement of parts shown and described without departing from the spirit and scope of our invention hence we would have it understood that we do not wish to confine ourselves to the exact construction and arrangement of parts shown and described but, Having fully described our invention what we claim as new and desire to secure by Letters-Patent is:—

1. In a stay bolt structure, the combination of a bearing member for the head of a stay bolt, the said member having an internal seat for the head of a bolt and outwardly tapering at its upper end, a ring having an internally tapered lower end to conform to the taper on the bearing member, the said ring being threaded at its upper end, and a cap secured to the ring and forming a cover for the bearing member.

2. In a staybolt structure, the combination of a bearing member for the head of a staybolt, the said member having an internal seat for the head of said bolt and outwardly tapered on its outer face at its upper end, a ring internally tapered at its inner end to conform to and form a clamping connection with said bearing member, and provided at its outer end with internal threads and a cap having external threads to engage the threaded end of the ring, the free edge of the cap adapted to engage and rest on the outer end of the bearing member.

3. In a staybolt structure, the combination of a bearing member having a rounded inner end for universal connection with a boiler sheet; an internal seat for the head of a stay bolt, and an outwardly tapered externally outer end, a ring having an internally tapered end to conform to and form a locking connection with the tapered surface of the bearing member, and a cap secured to the ring and forming a closure for the bearing member.

4. In a staybolt structure, the combination of a bearing member having a rounded end for universal connection with a boiler sheet; an internal seat for the head of a bolt and an outwardly tapered external outer end, a ring internally tapered at its inner end to form a clamping connection with the tapered end of the bearing member and internally threaded at its outer end and a flanged cap having external threads to engage the internal threads on the ring the flanged edge of the cap adapted to bear against the outer edge of the bearing member.

5. In a staybolt structure, the combination of a boiler sheet having a staybolt opening through the same, a bearing member seated in said opening and welded to the boiler sheet and provided with an internal seat for the head of a stay bolt and an externally outwardly tapered outer end, a stay bolt the head of which is seated in said bearing member, a ring internally tapered at its inner end to form a clamping connection with the tapered end of the bearing member and internally threaded at its outer end and a flanged cap threaded externally to engage the threads in the ring, the free edge of the flange resting on the outer edge of the bearing member.

6. In a staybolt structure, the combination of a boiler sheet having a stay bolt opening through the same, a bearing member seated in said opening and provided with an internal seat for the head of a staybolt and an externally outwardly tapered outer end, a ring internally tapered at its inner end to form a clamping connection with the tapered end of the bearing member and internally threaded at its outer end and a flanged cap threaded externally to engage the threads in the ring, the bearing member and ring being welded to the boiler sheet.

In testimony whereof, we have signed this specification in the presence of a subscribing witness.

JOHN ROGERS FLANNERY.
ETHAN I. DODDS.

Witness:
EDWIN S. RYCE.